United States Patent
Kocan

(10) Patent No.: US 9,667,779 B2
(45) Date of Patent: May 30, 2017

(54) ROUTING SERVICE

(71) Applicant: AT&T Intellectual Property I, L.P., Atlanta, GA (US)

(72) Inventor: Kristin Kocan, Warrenville, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/731,450

(22) Filed: Jun. 5, 2015

(65) Prior Publication Data

US 2016/0360033 A1   Dec. 8, 2016

(51) Int. Cl.
| | |
|---|---|
| *H04M 3/42* | (2006.01) |
| *H04W 4/16* | (2009.01) |
| *H04M 3/54* | (2006.01) |
| *H04W 40/20* | (2009.01) |
| *H04L 29/06* | (2006.01) |

(52) U.S. Cl.
CPC ...... *H04M 3/42357* (2013.01); *H04L 65/105* (2013.01); *H04L 65/1069* (2013.01); *H04L 65/1096* (2013.01); *H04M 3/54* (2013.01); *H04W 4/16* (2013.01); *H04W 40/20* (2013.01)

(58) Field of Classification Search
CPC ............... H04M 3/42042; H04M 3/51; H04M 3/42059; H04M 3/5233; H04M 3/5183; H04M 3/5191; H04M 7/0003; H04M 7/0006; H04M 7/0009; H04M 7/12; H04M 15/06; H04M 3/42102; H04M 3/436; H04M 3/42229; H04M 3/5116; H04M 3/5141; H04L 12/5855; H04L 51/14; H04L 67/24; H04Q 3/0029; H04Q 3/72; Y10S 379/90

See application file for complete search history.

(56) References Cited

U.S. PATENT DOCUMENTS

| | | | |
|---|---|---|---|
| 7,472,068 B2 * | 12/2008 | Koch ............... | H04M 3/527 379/211.02 |
| 7,602,895 B2 | 10/2009 | Terry et al. | |

(Continued)

OTHER PUBLICATIONS

Bokharouss et al., "A Location-Aware Mobile Call Handling Assistant," Advanced Information Networking and Applications Workshops, 2007, AINAW'07, 21$^{st}$ International Conference on, vol. 2, IEEE, 2007.

(Continued)

*Primary Examiner* — Nizar Sivji
(74) *Attorney, Agent, or Firm* — Hartman & Citrin LLC

(57) ABSTRACT

Concepts and technologies are disclosed herein for providing and using a routing service. A processor can obtain a routing scenario associated with a customer of the routing service. The routing scenario can specify customer data to be accessed to determine a call handling decision when a call is received from a calling party, and the customer data can include information associated with the calling party. The processor can obtain a request to route a call intended for the customer. The processor can generate a query of the customer data to obtain data associated with the calling party. The customer data can be stored at a storage location associated with the customer that is remote from the routing service. The processor can analyze the customer data and the routing scenario, determine a call handling decision, and provide the call handling decision to a network to route the call.

20 Claims, 9 Drawing Sheets

(56) References Cited

U.S. PATENT DOCUMENTS

| | | | |
|---|---|---|---|
| 7,653,389 B2 | 1/2010 | Eales et al. | |
| 7,916,846 B1 | 3/2011 | Farah | |
| 8,094,800 B1 | 1/2012 | Smith et al. | |
| 8,135,382 B1* | 3/2012 | Green | H04L 12/1403 455/406 |
| 8,406,409 B2 | 3/2013 | Smith et al. | |
| 8,611,519 B2* | 12/2013 | Shah | H04M 3/20 379/201.02 |
| 2007/0098146 A1* | 5/2007 | Rice | H04M 3/46 379/243 |
| 2007/0121911 A1* | 5/2007 | Baudino | H04M 1/274516 379/355.04 |
| 2007/0280455 A1* | 12/2007 | Cai | H04L 12/14 379/201.01 |
| 2008/0240382 A1* | 10/2008 | Fujita-Yuhas | G10L 25/48 379/88.16 |
| 2009/0060162 A1 | 3/2009 | Lachhiramka | |
| 2009/0086953 A1* | 4/2009 | Vendrow | H04M 3/436 379/207.02 |
| 2011/0026702 A1* | 2/2011 | Bot | H04M 3/4228 379/210.02 |
| 2011/0085646 A1* | 4/2011 | Sigmund | H04M 3/42102 379/88.22 |
| 2012/0088476 A1* | 4/2012 | Greenfield | H04M 1/72572 455/414.1 |
| 2012/0128141 A1* | 5/2012 | Daniell | H04M 15/00 379/93.24 |
| 2013/0091546 A1* | 4/2013 | Shen | H04L 63/08 726/3 |
| 2014/0287732 A1 | 9/2014 | Kannan | |
| 2015/0150115 A1* | 5/2015 | Le Rouzic | H04L 65/1016 726/14 |
| 2015/0207940 A1* | 7/2015 | Li | H04L 65/1016 370/259 |
| 2016/0036991 A1* | 2/2016 | Brewer | H04L 65/1076 370/356 |

OTHER PUBLICATIONS

Wobcke et al., A Call Handling Assistant for Mobile Devices, Intelligent Agent Technology, 2006, IAT'06, IEEE/WIC/ACM International Conference on, IEEE, 2006.

* cited by examiner

ROUTING SERVICE

BACKGROUND

Over the past several years, communication devices have become prevalent, whether fixed line, mobile, or even implemented as programs running in web browsers. Because of the prevalence of these devices, modern consumers may almost always be available. This can negatively impact quality of life, productivity, and/or other aspects of a consumer's life. To address this problem, modern communications devices sometimes provide options for handling communications such as providing call forwarding features, silent modes, do not disturb modes, and the like. These options, however, are typically quite limited.

SUMMARY

The present disclosure is directed to a routing service that is configured to route calls, send text messages, send other types of messages (e.g., email messages, multimedia service ("MMS") messages), prompt actions by other processors and/or entities, combinations thereof, or the like. A routing service can be hosted or executed by a server computer. The routing service can be interacted with by a user or other entity (e.g., an administrator, customer, or other entity using a user device or other device) to submit routing management data to the routing service. The routing management data can be obtained by the routing service and used by the routing service to generate one or more routing scenarios. The routing scenarios can be relevant to one or more users, accounts, devices, or the like, for example a called party device, and can be stored by the routing service in a data storage device such as a data store.

At some point in time, the routing service can receive a request to route a call or to otherwise provide a call handling decision to a requestor. In various embodiments, the request can be received by the routing service from a network, from an Internet protocol multimedia subsystem ("IMS"), from a proxy call session control function ("PCSCF"), and/or other entities in response to detecting or receiving a call destined for the called party device. The routing service can obtain, from a called party device or other entity, state information, location information, and one or more routing scenarios that are relevant to the call received. The routing service can analyze the routing scenarios, the state information, and the location information to determine how the call is to be handled. The routing service can issue a call handling decision to the network. In some embodiments, the call handling decision can be issued to the PCSCF of the IMS to effect the routing determined, or, if specified, the decision can be used to effect associated actions. It therefore should be understood that for purposes of this disclosure, the phrase "routing scenario" can be used to refer to instructions for routing calls or other communications, prompting messaging and/or other communications, and/or triggering actions or requests to other entities, processors, or the like.

According to one aspect of the concepts and technologies disclosed herein, a method is disclosed. The method can include obtaining, by a processor executing a routing service, a routing scenario associated with a customer of the routing service. The routing scenario can specify customer data to be accessed to determine a call handling decision when a call is received from a calling party, and the customer data can include information associated with the calling party. The method also can include obtaining, by the processor, a request to route a call intended for the customer, the call being received from the calling party; and generating, by the processor, a query of the customer data to obtain data associated with the calling party. The customer data can be stored at a storage location that is associated with the customer, and the storage location can be remote from the routing service. The method also can include analyzing, by the processor, the customer data and the routing scenario; determining, by the processor, the call handling decision based upon the customer data and the routing scenario; and providing, by the processor, the call handling decision to a network to route the call.

In some embodiments, the network can include an internet protocol multimedia subsystem that can include a proxy call session control function, and the proxy call session control function can perform an action in response to receiving the call handling decision. In some embodiments, the customer data can include an order history associated with the calling party. In some embodiments, the customer data can be obtained using a representational state transfer (hereinafter "REST") request.

In some embodiments, the method further can include generating the routing scenario and storing the routing scenario with data that identifies a called party associated with the call. In some embodiments, generating the routing scenario can include receiving, from a user device, routing management data. The routing management data can include a data source identifier that identifies a customer data source that can include the data storage location; a call handling rule; a state identifier that identifies an operating state during which the call handling rule applies; and geographic location data that identifies a location associated with the routing scenario and defines a location at which the routing scenario applies.

In some embodiments, obtaining the routing scenario can include obtaining two or more routing scenarios in response to determining that a group of routing scenarios has been activated. In some embodiments, the method further can include receiving a request to route the call, where the request can be received from a network. In some embodiments, the method also can include receiving a request to route the call, where the request can be received from a calling party device.

According to another aspect of the concepts and technologies disclosed herein, a system is disclosed. The system can include a processor and a memory. The memory can store computer-executable instructions that, when executed by the processor, cause the processor to perform operations. The operations can include obtaining a routing scenario associated with a customer of the routing service. The routing scenario can specify customer data to be accessed to determine a call handling decision when a call can be received from a calling party. The customer data can include information associated with the calling party. The operations also can include obtaining a request to route a call intended for the customer, the call being received from the calling party; generating a query of the customer data to obtain data associated with the calling party, where the customer data can be stored at a storage location that can be associated with the customer, and where the storage location can be remote from the routing service; analyzing the customer data and the routing scenario; determining the call handling decision based upon the customer data and the routing scenario; and providing the call handling decision to a network to route the call.

In some embodiments, the network can include an internet protocol multimedia subsystem that can include a proxy call session control function, and the proxy call session control function can perform an action in response to receiving the call handling decision. In some embodiments, the customer data can include an order history associated with the calling party. In some embodiments, the customer data can be obtained using a REST request. In some embodiments, the computer-executable instructions, when executed by the processor, can cause the processor to perform operations further including generating the routing scenario; and storing the routing scenario with data that identifies a called party associated with the call. In some embodiments, generating the routing scenario can include receiving, from a user device, routing management data. The routing management data can include a data source identifier that identifies a customer data source that can include the data storage location; a call handling rule; a state identifier that identifies an operating state during which the call handling rule applies; and geographic location data that identifies a location associated with the routing scenario and defines a location at which the routing scenario applies.

According to yet another aspect, a computer storage medium is disclosed. The computer storage medium can have computer-executable instructions stored thereon. When the computer-executable instructions are executed by a processor, the processor can perform operations including obtaining a routing scenario associated with a customer of the routing service, where the routing scenario specifies customer data to be accessed to determine a call handling decision when a call can be received from a calling party, and where the customer data can include information associated with the calling party; obtaining a request to route a call intended for the customer, the call being received from the calling party; generating a query of the customer data to obtain data associated with the calling party, where the customer data can be stored at a storage location that can be associated with the customer, and where the storage location can be remote from the routing service; analyzing the customer data and the routing scenario; determining the call handling decision based upon the customer data and the routing scenario; and providing the call handling decision to a network to route the call.

In some embodiments, the network can include an internet protocol multimedia subsystem that can include a proxy call session control function, and the proxy call session control function can perform an action in response to receiving the call handling decision. In some embodiments, the customer data can include an order history associated with the calling party. In some embodiments, the computer-executable instructions, when executed by the processor, can cause the processor to perform operations further including generating the routing scenario; and storing the routing scenario with data that identifies a called party associated with the call. In some embodiments, generating the routing scenario can include receiving, from a user device, routing management data. The routing management data can include a data source identifier that identifies a customer data source that can include the data storage location; a call handling rule; a state identifier that identifies an operating state during which the call handling rule applies; and geographic location data that identifies a location associated with the routing scenario and defines a location at which the routing scenario applies.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to a routing service. A routing service can be hosted or executed by a server computer. The routing service can be interacted with by a user or other entity (e.g., an administrator, customer, or other entity using a user device or other device) to submit routing management data to the routing service. The routing management data can be obtained by the routing service and used by the routing service to generate one or more routing scenarios. The routing scenarios can be relevant to one or more users, accounts, devices, or the like, for example a called party device, and can be stored by the routing service in a data storage device such as a data store.

At some point in time, the routing service can receive a request to route a call or to otherwise provide a call handling decision to a requestor. In various embodiments, the request can be received by the routing service from a network, from an Internet protocol multimedia subsystem ("IMS"), from a proxy call session control function ("PCSCF"), and/or other entities in response to detecting or receiving a call destined for the called party device. The routing service can obtain, from a called party device or other entity, state information, location information, and one or more routing scenarios that are relevant to the call received. The routing service can analyze the routing scenarios, the state information, and the location information to determine how the call is to be handled. The routing service can issue a call handling decision to the network. In some embodiments, the call handling decision can be issued to the PCSCF of the IMS to effect the routing determined.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
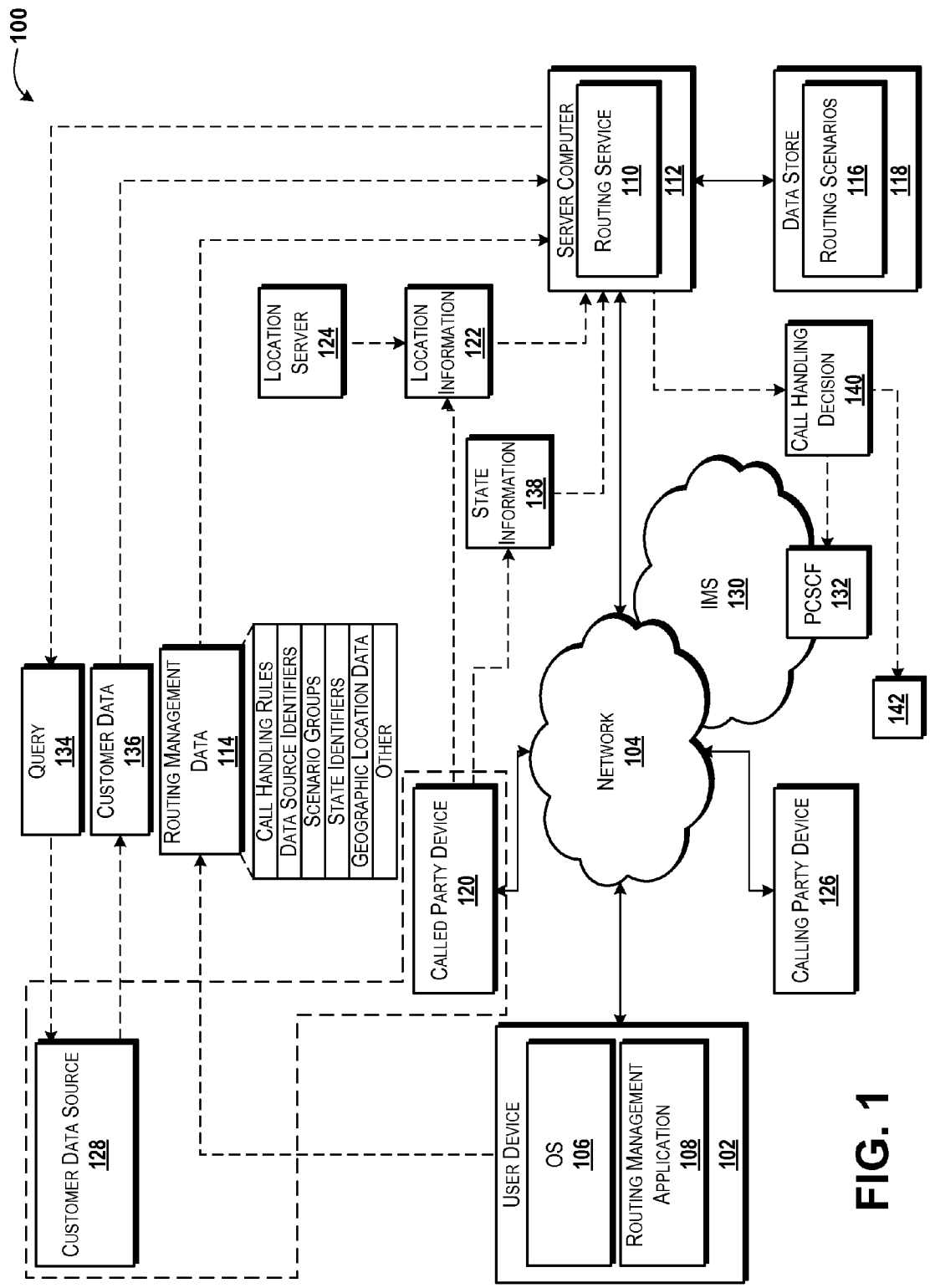
FIG. 1 is a system diagram illustrating an illustrative operating environment for various embodiments of the concepts and technologies described herein.

Referring now to FIG. 1, aspects of an operating environment 100 for various embodiments of the concepts and technologies disclosed herein for providing and using a routing service will be described, according to an illustrative embodiment. The operating environment 100 shown in FIG. 1 includes a user device 102 operating in communication with and/or as part of a communications network ("network") 104.

According to various embodiments, the functionality of the user device 102 may be provided by one or more server computers, desktop computers, mobile telephones, smartphones, tablet computers, laptop computers, smart watches, web browsers (e.g., browser-based implementations of communication devices), set-top boxes, vehicle computing systems, other computing systems, and the like. It should be understood that the functionality of the user device 102 can be provided by a single device, by two or more similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a routing management application 108. The operating system 106 can be a computer program for controlling the operation of the user device 102. The routing management application 108 can be an executable program configured to execute on top of the operating system 106 to provide various functions as illustrated and described herein for interacting with and/or using a routing service. According to various embodiments, the functionality of the routing management application 108 can be provided by a web browser, a web application, and/or a standalone application. Thus, it can be appreciated that a web browser application can execute instructions to provide the functionality illustrated and described herein. Because the application programs can include other applications that are generally understood (e.g., mail programs, messaging programs, web browsing programs, standalone applications, combinations thereof, or the like), the example embodiment shown in FIG. 1 should not be construed as being limiting in any way the concepts and technologies described herein.

The routing management application 108 can be configured to interact with an application, program, module, service, or other software such as a routing service 110 to enable management, control, and/or use of the routing service 110 and/or to interface with other entities to manage (or effect management of) the routing service 110. In the illustrated embodiment, the routing management application 108 can be used to interact with and/or control the routing service 110, though this is not necessarily the case. The routing service 110 can be a callable service executed and/or hosted by a computing device such as a server computer 112.

The routing management application 108 and the routing service 110 can be configured to exchange various types of information with one another to provide, use, and/or control the routing service 110 to provide communication handling in accordance with the concepts and technologies described herein. According to various embodiments, the routing management application 108 can be configured to collect and transmit to the routing service 110 one or more instances of routing management data 114. The routing management data 114 will be described in more detail below.

The routing service 110 can be interacted with by an entity such as a user, customer, network operator, an administrator, or the like to create one or more routing scenarios 116. In some embodiments, the user device 102 can create the routing scenarios 116 by submitting to (or exchanging with) the routing service 110 the routing management data 114. This will be illustrated and described in more detail hereinbelow.

As shown in FIG. 1, the routing scenarios 116 can be stored in a data storage device such as a database, a data server, a mass data storage device, or the like ("data store") 118. In the embodiment shown in FIG. 1, the functionality of the data store can be provided by one or more databases, data storage device, server computers, desktop computers, mobile telephones, laptop computers, other computing systems, and the like. For purposes of illustrating and describing the various embodiments of the concepts and technologies described herein, the data store 118 is illustrated and described herein as data hosted by a server computer. It should be understood that this example is illustrative and therefore should not be construed as being limiting in any way.

The routing service 110 also can be configured to track a geographic location associated with a device such as, for example, a called party device 120. According to various embodiments, the routing service 110 can obtain location information 122. The location information 122 can specify a current location of the called party device 120 and can be obtained from various entities. In some embodiments, for example, the location information 122 can be provided by the called party device 120 to the routing service 110, while in some other embodiments, the location information 122 can be provided by a location based services ("LBS") device such as a location server 124. Because the location of the user device 102 can be determined in additional and/or alternative ways, it should be understood that this example is illustrative and therefore should not be construed as being limiting in any way.

The operating environment 100 also can include a calling party device 126. At some point in time, the calling party device 126 can initiate a communication with the called party device 120. The communication can include a telephone call, a voice over Internet protocol ("VoIP") call, a short message service ("SMS" or "text") message, a multimedia service ("MMS") message, an email communication, an application call, combinations thereof, or the like. When the calling party device 126 initiates a communication with the called party device 120, the network 104 can determine that the called party device 120 subscribes to (or otherwise is entitled to) functionality associated with the routing service 110 and therefore can call the routing service 110 to provide the functionality illustrated and described herein for routing communications. Because the functionality of the routing service 110 can be provided at additional or alternative times, it should be understood that this example is illustrative and therefore should not be construed as being limiting in any way.

The operating environment 100 also can include a customer data source 128. The customer data source 128 can include a database, server, application, service, or other source of information that is associated with a customer or other entity. According to various embodiments of the concepts and technologies described herein, the customer data source 128 can be owned by a customer of the routing service 110. The customer can also own the called party device 120 and the user device 102, which can be used by an administrator to tailor how calls or other communications intended for the called party device 120 are handled. It should be understood that this example is illustrative and therefore should not be construed as being limiting in any way.

The customer data source 128 can include any information. The information can be obtained and used by the routing service 110 to make a decision on call routing. Thus, it can be appreciated that the routing service 110 can override or modify call handling rules based upon customer information. The data stored in the customer data source 128 can include, but is not limited to, call histories, purchase histories, demographic data, company information, combinations thereof, or the like. The data stored in the customer data source 128 can include information associated with the calling party device 126. As such, the routing service 110 can obtain, from a source associated with the called party device 120, information associated with the calling party device 126 and make call routing decisions based upon that information without storing the information locally. This aspect of the concepts and technologies described herein will be illustrated and described in more detail herein.

The operating environment 100 also can include an Internet Protocol multimedia subsystem ("IMS") 130. According to various embodiments, the call or other communication between the called party device 120 and the calling party device 126 can occur via (or can be controlled via) the IMS 130. The IMS 130 can include a proxy call session control function ("PCSCF") 132. According to various embodiments of the concepts and technologies described herein, the PCSCF 132 can route the communication between the called party device 120 and the calling party device 126 in accordance with various rules and/or in accordance with the routing scenarios 116. Because the IMS 130 is generally understood, the IMS 130 is not further described herein.

As the elements of the operating environment 100 have been briefly described above, some embodiments of the concepts and technologies described herein for configuring and using the routing service 110 will now be described in detail. As noted above, the routing management application 108 can be used to create one or more instances of routing management data 114. The routing management data 114 can include one or more call handling rules, one or more state identifiers, one or more instance of geographic location data, one or more data source identifiers, one or more scenario groups, other information, combinations thereof, or the like. According to various embodiments of the concepts and technologies described herein, a user or other entity can interact with the routing management application 108 and/or the routing service 110 to create the routing management data 114 and/or the components thereof, each of which is described in more detail below. Thus, it can be appreciated that a user or other entity can interact with the routing service 110 via a web portal, a web application, a standalone application, and/or other executable software to create the routing management data 114.

The call handling rules can define, for one or more routing scenarios 116, one or more rules, options, settings, or preferences for handling communications such as calls, emails, text messages, data sessions, pages, combinations thereof, or the like (collectively referred to herein as "calls"). The call handling rules can define, for example, that calls are to be forwarded to voicemail, forwarded to another number, or otherwise forwarded; that incoming calls should always be provided to the user (e.g., an alert or ring should always be generated) even if a called party device 120 is on silent mode, in do not disturb mode, in use, or the like; that information relating to calls should be logged and/or reminders generated; that calls and/or information associated with the calls should be sent to third parties; combinations thereof; or the like.

Additionally, as noted above, the call handing rules can define other actions that can be prompted, triggered, and/or performed when the calls are received or acted on. Thus, for example, the call handling rules can define messages that are to be generated and/or to whom the messages are to be sent (e.g., SMS, MMS, email, and/or other messages and/or entities, devices, services, applications, and/or processors that are to receive the messages), processes and/or operations to be performed upon receiving or acting on a call, other network entities and/or functionality that is or are to be invoked upon receipt or interaction with the calls, combinations thereof, or the like. Because the call handling rules can define any desired actions and/or can entail any other entities, it should be understood that these examples are illustrative and therefore should not be construed as being limiting in any way.

The call handling rules also can define times of day, days of the week, and/or other parameters that can define when a particular routing scenario 116 will and/or will not apply. The call handling rules also can define particular users and/or groups of users for whom particular routing scenarios 116 apply and/or do not apply. Thus, it can be appreciated that the call handling rules can define how calls in general are to be handled, as well as defining how particular calls (e.g., calls associated with specific calling party devices 126) are to be handled. It should be understood that this example is illustrative and therefore should not be construed as being limiting in any way.

The state identifiers can define, for one or more routing scenarios 116, device or operating state identifiers. These state identifiers can identify operating states for devices for use in call handling and therefore can specify, for example, what operating states will or will not alter a call handling decision made by the routing service 110. For example, the state identifiers can include "on—in use for data session" as a state that will not alter a call handling decision and "on—in do not disturb mode" as a state that will alter a call handling decision. The possible state identifiers include, but are not limited to, identifiers for specifying states such as "on-not in use," "on-active data session," "on-active voice session," "on-active application," "on-not in use and silent mode," "on-not in use and do not disturb mode," "on-in use and silent mode," "on-in use and do not disturb mode," "off," "on-battery at critical level," "on-poor signal," other states, combinations thereof, or the like. These states can be used as part of a call handling decision, as mentioned above and as will be illustrated and described in more detail below, particularly with reference to FIG. 3.

The geographic location data can define, for one or more routing scenarios 116, one or more geographic locations at which a particular routing scenario 116 will or will not apply. The geographic location data can define location in various manners including, but not limited to, indicating a ZIP code; indicating a telephone area code; indicating a street address; indicating a city, state, or the like; indicating a set of coordinates such as latitude/longitude or global positioning system coordinates; combinations thereof; or the like. Because a geographic location can be defined in a number of manners not listed below, it should be understood that these examples are illustrative and therefore should not be construed as being limiting in any way.

The data source identifiers can identify, for one or more routing scenarios 116, data sources that are to be queried or used when making a call handling decision. Thus, the data source identifiers can identify one or more data sources, services, or other resources that are to be accessed and/or used when a call handling decision is being made. According to various embodiments, the data source identifiers therefore can identify one or more data sources such as the customer data source 128, which can be owned by a party associated with the calling party device 126 and made available, via a designation by the customer, to the routing service 110 without copying the data to a data storage device local to or otherwise associated with the routing service 110. It should be understood that this example is illustrative and therefore should not be construed as being limiting in any way.

The data source identifiers can include uniform resource identifiers ("URIs") and/or uniform resource locators ("URLs"), file locations, service locations, network locations, combinations thereof, or the like. When a routing scenario 116 is implicated by a particular incoming call (incoming to the network 104 and/or to the called party device 120), the sources associated with the data source identifiers can be accessed, queried, and/or otherwise interacted with to obtain the desired information. In the embodiment illustrated in FIG. 1, the routing service 110 generates one or more query 134 of the identified data source (the customer data source 128 in FIG. 1), and obtains customer data 136 from the data source in response to the query 134. It should be understood that this example is illustrative and therefore should not be construed as being limiting in any way.

The scenario groups can be used to define one or more sets or groups of routing scenarios 116. Thus, the scenario groups can define two or more routing scenarios 116 that are to apply at a given time. For example, a user or other entity can create a scenario group for use when the entity is on vacation. The scenario group can define call handling rules for various types of communications. A user or other entity can activate a group of routing scenarios 116 for use at a particular time. When the user wishes, the use of the group of routing scenarios 116 can be suspended and/or replaced by activation of another scenario group. Some example user interfaces for creating and/or managing scenario groups, as well as additional details relating to the scenario groups, are illustrated and described in more detail below with reference to FIGS. 4B-4C. It should be understood that this example is illustrative and therefore should not be construed as being limiting in any way.

The other information can include other types of data that may be considered when making call handling decisions. Thus, the other information can include identifiers of calling parties (e.g., phone numbers, IP addresses, email addresses, or the like), organization information (e.g., my boss, my assistant, etc.), family information (e.g., my son, my daughter, my wife, etc.), combinations thereof, or the like. These and other types of information can be used to determine how particular calls should be handled. Because the other information can include other types of information, it should be understood that this example is illustrative and therefore should not be construed as being limiting in any way.

To provide the functionality illustrated and described herein, the routing service 110 can receive the routing management data 114 and generate (or create), based upon the routing management data 114, one or more routing scenarios 116. The routing scenarios 116 can define call handling rules for a particular called party device 120 based upon a current (defined as the time a call or communication is received) time of day, a day of the week, a geographic location, an operating state of the called party device 120, calling party information and/or identity associated with a calling party device 126, combinations thereof, or the like. The routing service 110 can obtain, for a called party device 120, state information 138 and location information 122. The routing service 110 can analyze the routing scenarios 116, the state information 138, and the location information 122 to determine how the call is to be handled. After determining how the call will be handled, the routing service 110 can issue one or more call handling decision 140 to effect handling of the communication in accordance with the determined call handling decision 140.

According to various embodiments of the concepts and technologies described herein, the routing service 110 provides the call handling decision 140 to the PCSCF 132 of an IMS 130 associated with the network 104, and the PCSCF 132 applies the determined call handling decision 140 to effect the determined routing. Additionally, as shown in FIG. 1, the call handling decision 140 can be passed to another entity such as a processor, a messaging platform, an administrator device, or the like ("other entity") 142 in addition to, or instead of, being passed to the PCSCF 132. The other entity 142 can perform various actions, trigger various actions, and/or process the call handling decision 140 according to various rules, or the like. Thus, it can be appreciated that the other entity 142 can include a short message service center ("SMSC"), multimedia message service center ("MMSC"), email server, messaging platform, or the like, which can generate, trigger, and/or send one or more messages to various recipients in response to receiving the call handling decision 140.

Additionally, or alternatively, the entity 142 can filter calls, apply block lists, set priorities, and/or store information associated with the calls (or other types of communications) for various purposes such as analysis, logging, billing, combinations thereof, or the like. The entity 142 also can include applications, services, and/or other resources that can perform various operations and/or processes upon receipt of the call (or other communication). As such, various types of operations and/or actions can be performed by the entity 142, and as such, it should be understood that these examples are illustrative and therefore should not be construed as being limiting in any way.

In practice, the routing service 110 can be hosted or executed by the server computer 112. The routing service 110 can be interacted with by a user or other entity (e.g., an administrator, customer, or other entity using the user device 102 or other device) to submit the routing management data 114. The routing management data 114 can be obtained by the routing service 110 and used by the routing service 110 to generate one or more routing scenarios 116. The routing scenarios 116 can be relevant to one or more users, accounts, devices, or the like, for example the called party device 120, and can be stored by the routing service 110 in a data storage device such as the data store 118.

At some point in time, the routing service 110 can receive a request to route a call or to otherwise provide a call handling decision 140 to a requestor. In various embodiments, the request can be received by the routing service 110 from the network 104, from the IMS 130, from the PCSCF 132, and/or other entities in response to detecting or receiving a call destined for the called party device 120. The routing service 110 can obtain, from the called party device 120 or other entity, state information 138, location information 122, and one or more of the routing scenarios 116 that are relevant to the call received. The routing service 110 can analyze the routing scenarios 116, the state information 138, and the location information 122 to determine how the call is to be handled. The routing service 110 can issue a call handling decision 140 to a PCSCF 132 of the IMS 130 to effect the routing determined.

FIG. 1 illustrates one user device 102, one network 104, one server computer 112, one data store 118, one location server 124, one customer data source 128, one IMS 130, and one PCSCF 132. It should be understood, however, that various implementations of the operating environment 100 can include zero, one, or more than one user device 102; zero, one, or more than one network 104; zero, one, or more than one server computer 112; zero, one, or more than one data store 118; zero, one, or more than one location server 124; zero, one, or more than one customer data source 128; zero, one, or more than one IMS 130; and zero, one, or more than one PCSCF 132. As such, the illustrated embodiment should be understood as being illustrative, and should not be construed as being limiting in any way.

Figure 2:
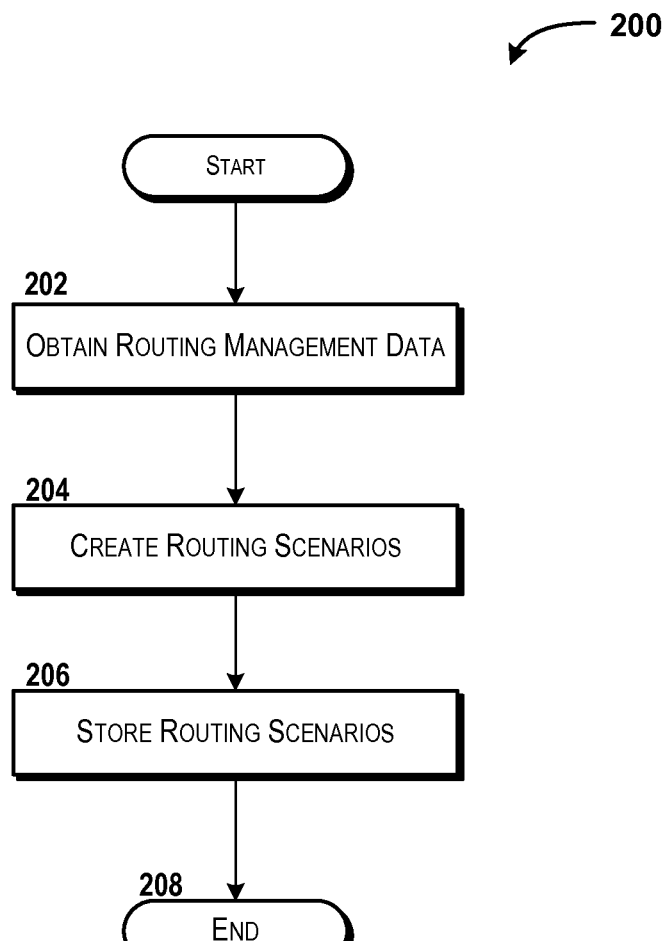
FIG. 2 is a flow diagram showing aspects of a method for creating routing scenarios, according to an illustrative embodiment of the concepts and technologies described herein.

Turning now to FIG. 2, aspects of a method 200 for creating routing scenarios will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the methods disclosed herein are described as being performed by the server computer 112 via execution of one or more software modules such as, for example, the routing service 110. It should be understood that additional and/or alternative devices and/or network nodes can provide the functionality described herein via execution of one or more modules, applications, and/or other software including, but not limited to, the routing service 110. Thus, the illustrated embodiments are illustrative, and should not be viewed as being limiting in any way.

The method 200 begins at operation 202. At operation 202, the server computer 112 can obtain routing management data 114 from a device such as the user device 102. According to various embodiments, the server computer 112 can be interacted with by the device (e.g., the user device 102) to create or submit the routing management data 114. Thus, it can be appreciated that the data obtained in operation 202 can be obtained by the server computer 112 via interactions between an entity and the server computer 112 via a web portal or other portal exposed by the server computer 112, by receiving data from the entity, and/or in other manners. Because the routing management data 114 can be obtained in any number of manners, it should be understood that these examples are illustrative and therefore should not be construed as being limiting in any way.

From operation 202, the method 200 proceeds to operation 204. At operation 204, the server computer 112 can create, based upon the data obtained in operation 202, one or more routing scenarios 116. The routing scenarios 116 can include data that represents one or more call handing rules, one or more geographic locations at which the routing scenarios 116 will and/or will not apply, one or more state identifiers that can identify one or more operational states for which the routing scenarios 116 will and/or will not apply, one or more data source identifiers that can identify one or more resources (e.g., data sources, web pages, web applications, files, or the like) that are to be accessed when routing a call, and/or other information. According to various embodiments, the server computer 112 also can capture information that identifies the user or other entity associated with the routing scenarios 116. This information can be used to index and/or query the routing scenarios 116. It can be appreciated that when routing is being performed, the identity of the called party and/or called party device 120 can be used to query or search the routing scenarios 116 to identify relevant routing scenarios 116. It should be understood that this example is illustrative and therefore should not be construed as being limiting in any way.

From operation 204, the method 200 proceeds to operation 206. At operation 206, the server computer 112 can store the routing scenarios 116. As noted above, the routing scenarios 116 can be stored with data that indexes the routing scenarios 116 to particular users and/or devices, though this is not necessarily the case. The routing scenarios 116 can be stored at a data storage location such as, for example, the data store 118. It should be understood that this example is illustrative and therefore should not be construed as being limiting in any way.

From operation 206, the method 200 proceeds to operation 208. The method 200 ends at operation 208.

Figure 3:
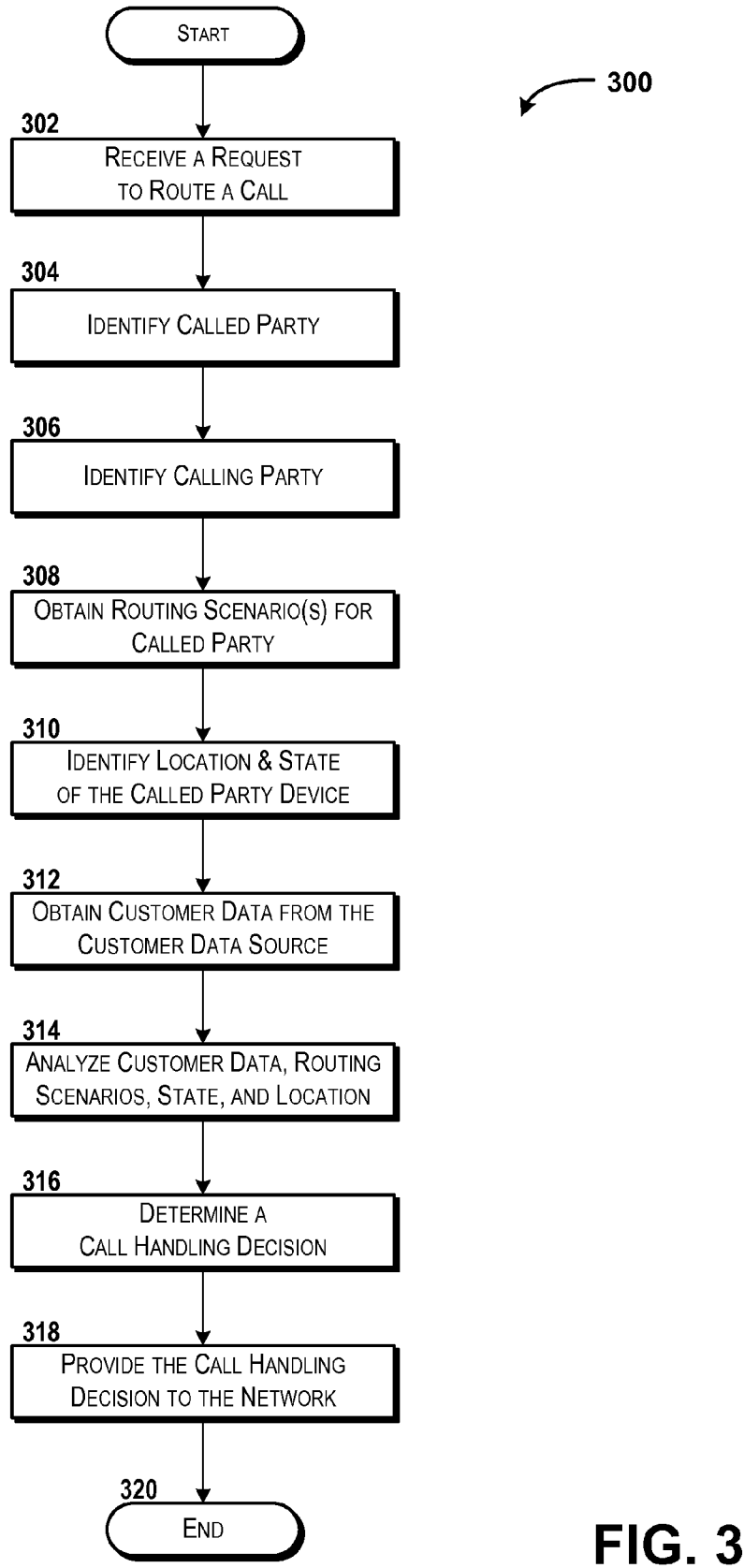
FIG. 3 is a flow diagram showing aspects of a method for routing a communication using a routing service, according to an illustrative embodiment of the concepts and technologies described herein.

Turning now to FIG. 3, aspects of a method 300 for routing a communication using a routing service will be described in detail, according to an illustrative embodiment. The method 300 begins at operation 302. At operation 302, the server computer 112 can receive a request to route a call. The request received in operation 302 can be generated by various entities. In some embodiments, for example, the request to route a call can be received from a device operating on the network 104 (e.g., a call routing server), a device operating on the IMS 130 (e.g., the PCSCF 132), the called party device 120, the calling party device 126, combinations thereof, or the like. The request can correspond to a service call and can prompt the server computer 112 to make a call handling decision 140. It can be appreciated that the request received in operation 302 can include data that identifies one or both of the calling party device 126 and the called party device 120. It should be understood that this example is illustrative and therefore should not be construed as being limiting in any way.

From operation 302, the method 300 proceeds to operation 304. At operation 304, the server computer 112 can identify the called party. According to various embodiments, server computer 112 can identify the called party based upon information that identifies the called party device 120. This information can be, but is not necessarily, included in the request received in operation 302 and/or determined by the server computer 112 in other manners.

From operation 304, the method 300 proceeds to operation 306. At operation 306, the server computer 112 can identify the calling party. According to various embodiments, server computer 112 can identify the calling party based upon information that identifies the calling party device 126, which as noted above can be (but is not necessarily) included in the request received in operation 302 and/or determined by the server computer 112 in other manners.

From operation 306, the method 300 proceeds to operation 308. At operation 308, the server computer 112 can obtain one or more routing scenarios 116 associated with the called party. As noted above, the routing scenarios 116 can be stored with data that associates the routing scenarios 116 with one or more called party and/or called party device 120. As such, the routing scenarios 116 can be searched or queried by the server computer 112 to identify one or more routing scenarios 116 that are relevant to a particular called party and/or called party device 120.

From operation 308, the method 300 proceeds to operation 310. At operation 310, the server computer 112 can identify a location and state of the called party device 120. As explained above, the server computer 112 can query the called party device 120, a location server 124, and/or other devices or entities to determine the geographic location of the called party device 120. The server computer 112 can receive location information 122 from the called party device 120, the location server 124, and/or other devices. The server computer 112 also can query the called party device 120 to determine the current operating state of the called party device 120. Because the location and state information associated with the called party device 120 can be obtained in additional and/or alternative manners, it should be understood that these examples are illustrative and therefore should not be construed as being limiting in any way.

From operation 310, the method 300 proceeds to operation 312. At operation 312, the server computer 112 can obtain customer data 136 from the customer data source 128. As illustrated and described above with reference to FIG. 1, the server computer 112 can identify the customer data source 128 based upon the routing scenarios 116. More particularly, the routing scenarios 116 can include one or more data source identifiers that can identify a data source to be accessed or queried by the server computer 112 when a call handling decision 140 is being formulated, and the server computer 112 can generate a call or query (e.g., the query 134) to the customer data source 128 in operation 312 and receive the customer data 136 in response to the query 134. According to various embodiments, the server computer 112 can access the URLs and/or generate REST requests to access specific web pages or web applications, if desired, to obtain the customer data 136. Because the customer data 136 can be obtained by the server computer 112 from the customer data source 128 in additional and/or alternative manners, it should be understood that this example is illustrative and therefore should not be construed as being limiting in any way.

From operation 312, the method 300 proceeds to operation 314. At operation 314, the server computer 112 can analyze the customer data 136, the routing scenarios 116, the state information 138, and the location information 122. The server computer 112 can analyze these data to determine how a call should be routed. From operation 314, the method 300 proceeds to operation 316. At operation 316, the server computer 112 can generate a call handing decision 140 based upon the analysis in operation 314. The call handling decision 140 can correspond to instructions that, when executed by a device, cause the device to implement the determined call handling.

From operation 316, the method 300 proceeds to operation 318. At operation 318, the server computer 112 can provide the call handling decision 140 to a device or entity such as a device operating on the network 104. According to various embodiments, the server computer 112 can provide the call handling decision 140 to the PCSCF 132 of the IMS 130 of the network 104. By providing the call handling decision 140 to the PCSCF 132, embodiments of the concepts and technologies described herein can cause the PCSCF 132, a device at the periphery of the IMS 130, to apply the call handling decision 140. In some embodiments, the PCSCF 132 can perform the call routing in association with other session control function ("SCF") functionality associated with the network 104 and/or the IMS 130.

From operation 318, the method 300 proceeds to operation 320. The method 300 can end at operation 320.

Figure 4A:
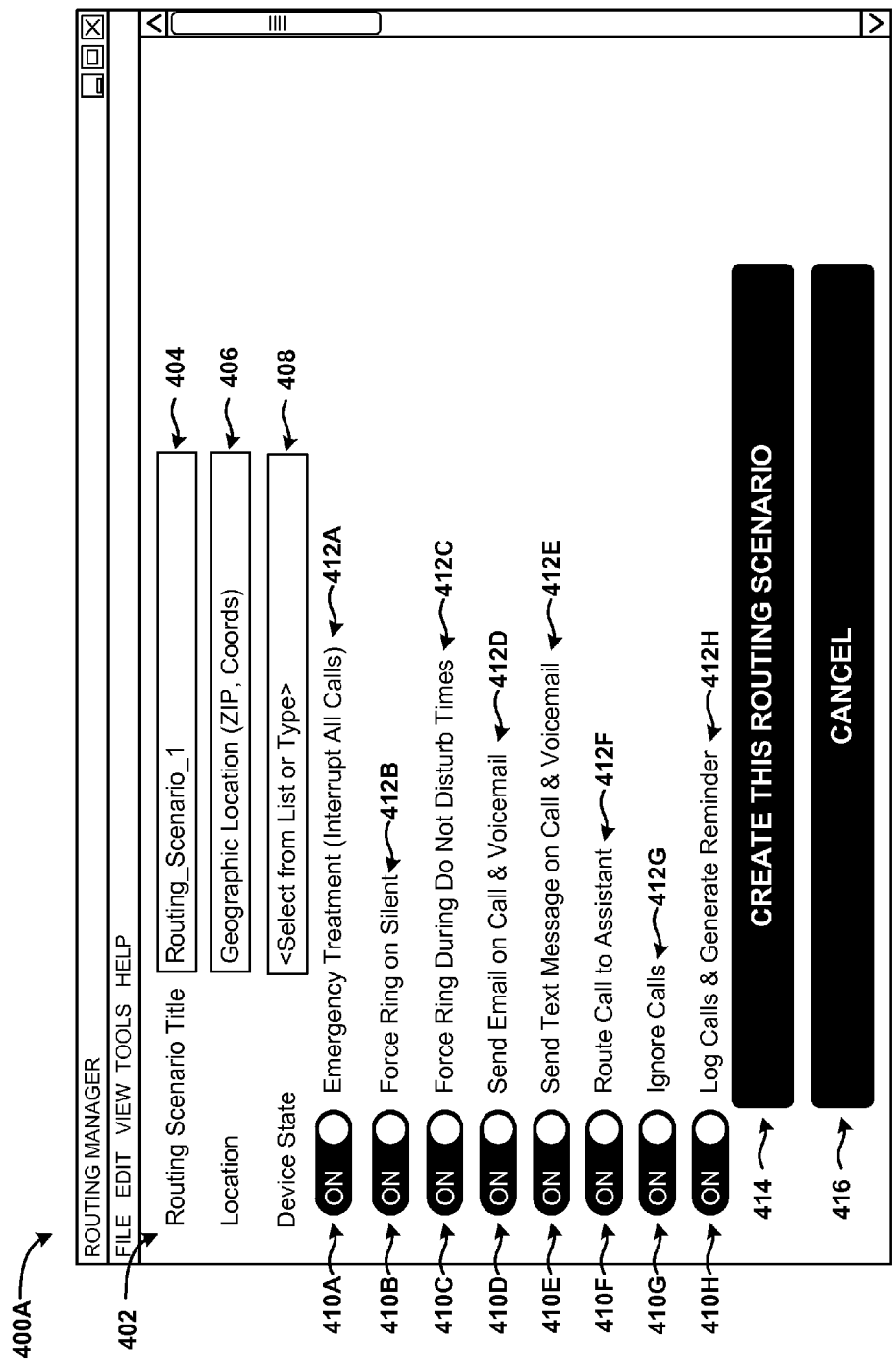
FIGS. 4A-4C are user interface diagrams showing various screen displays for interacting with a routing service, according to some illustrative embodiments of the concepts and technologies described herein.
Figure 4B:
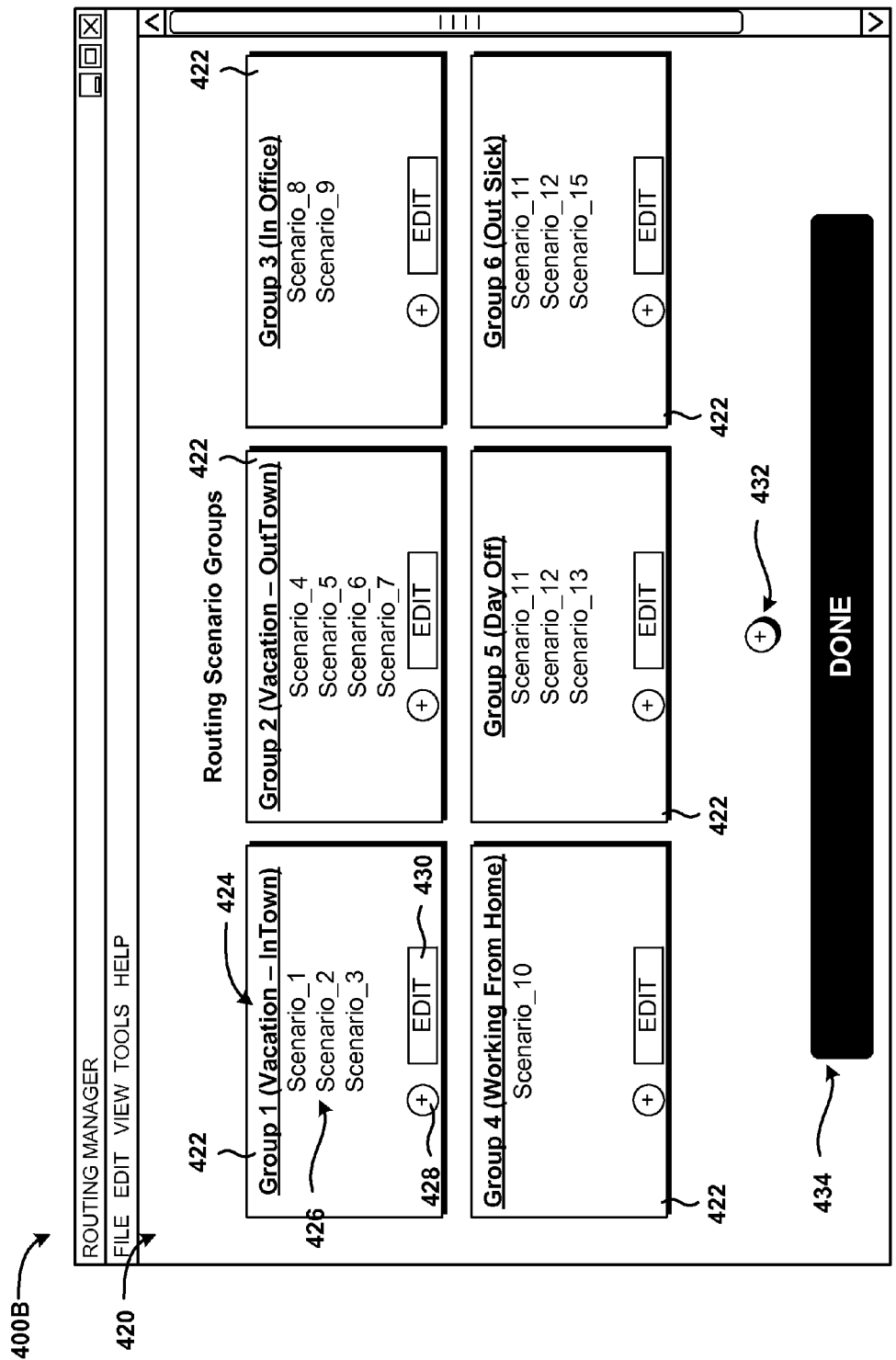
Figure 4C:
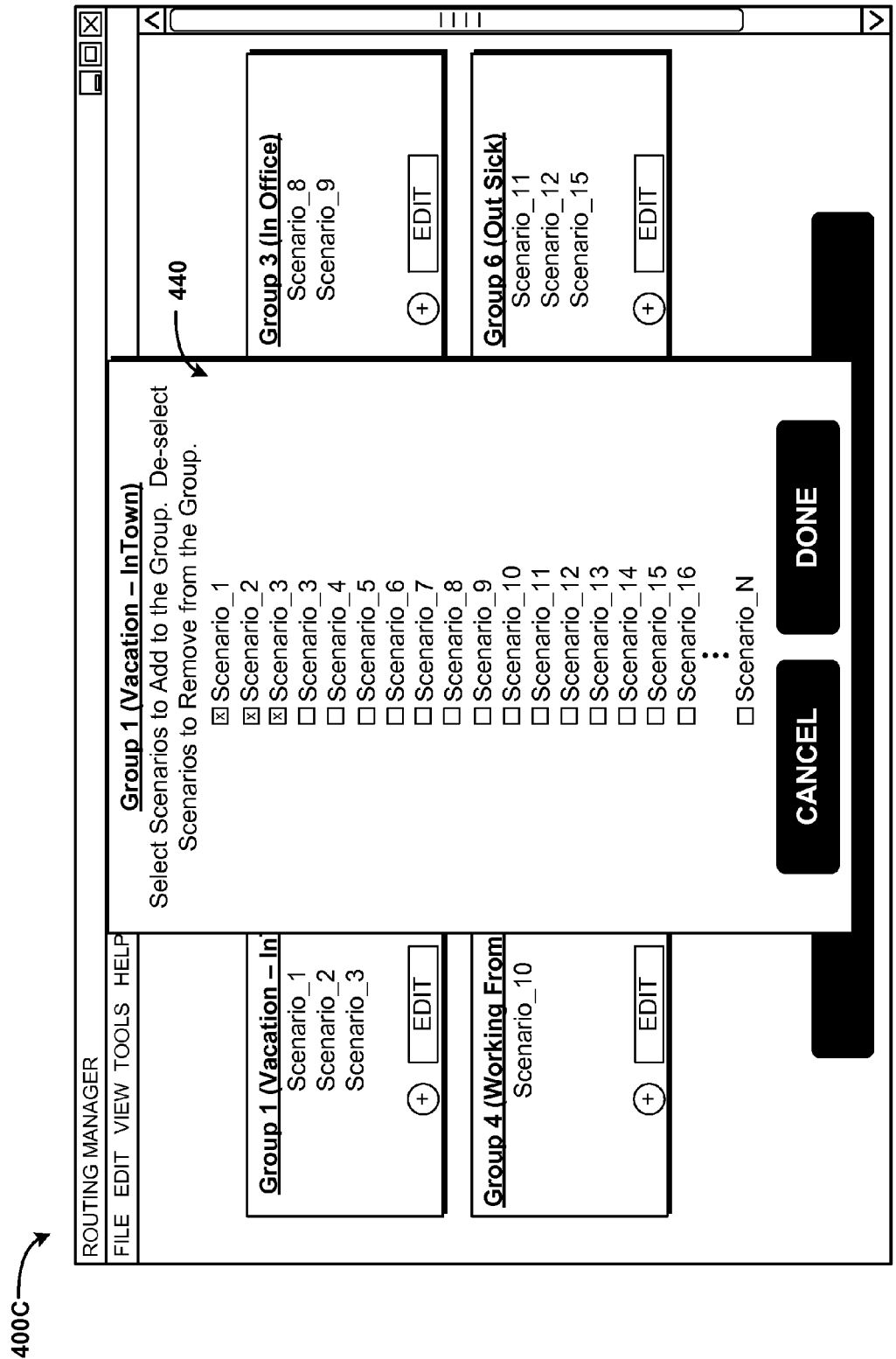

FIGS. 4A-4C are user interface ("UI") diagrams showing aspects of UIs for using and/or interacting with a routing service 110, according to some illustrative embodiments. FIG. 4A shows an illustrative screen display 400A, which can be generated by a device such as the user device 102 via interactions with the routing service 110. According to various embodiments, the user device 102 can generate the screen display 400A and/or other screen displays in conjunction with and/or based upon interactions with the routing service 110 described herein (e.g., via rendering web data provided by a web portal exposed by the routing service 110, or the like). It should be appreciated that the UI diagram illustrated in FIG. 4A is illustrative of one contemplated example of the UIs that can be generated and/or displayed in accordance with the concepts and technologies disclosed herein, and therefore should not be construed as being limiting in any way.

According to various embodiments, the screen display 400A can be presented, for example, during interactions between an administrator and the routing service 110, for example during creation of a routing scenario 116 as illustrated and described above with reference to FIG. 2. The screen display 400A also (or alternatively) can be presented in response to detecting a request to modify or edit a routing scenario 116, in response to a request to set preferences and/or settings associated with the routing service 110 and/or one or more routing scenarios, or at other times. Because the screen display 400A illustrated in FIG. 4A can be displayed at additional and/or alternative times, it should be understood that these examples are illustrative and therefore should not be construed as being limiting in any way.

The screen display 400A can include various menus and/or menu options (not shown in FIG. 4A). The screen display 400A also can include a routing service options display screen 402. The routing service options display screen 402 can be configured to allow a user or other entity to control various options associated with the routing service 110 and/or one or more options associated with a routing scenario 116. As shown in FIG. 4A, the routing service options display screen 402 can include a number of fields and/or controls, which are described in more detail below.

For example, the routing service options display screen 402 can include routing scenario title field 404. A user can enter a name for a routing scenario 116 in the routing scenario title field 404. When the routing scenario 116 is created, the title entered in the routing scenario title field 404 can be saved as the title for the routing scenario 116. It should be understood that this example is illustrative and therefore should not be construed as being limiting in any way.

The routing service options display screen 402 also can include a location field 406. The location field 406 can be used to specify a geographic location associated with a particular routing scenario 116. As explained herein, the geographic location specified in the location field 406 and/or otherwise specified for a particular routing scenario 116 can be part of the routing scenario 116 and therefore may be used to determine if a particular routing scenario 116 applies or does not apply at a particular time. In particular, a geographic location associated with a particular routing scenario 116 can define a geographic location. When the called party device 120 is at or near a geographic location associated with a corresponding routing scenario 116, that routing scenario 116 will apply. When the called party device 120 is not at or near a geographic location associated with a corresponding routing scenario 116, that routing scenario 116 will not apply. The geographic location can be defined in various manners including, but not limited to, global positioning system coordinates, a ZIP code, a telephone area code, a street address, a business name, combinations thereof, or the like. Because geographic location can be defined in various ways, it should be understood that this example is illustrative and therefore should not be construed as being limiting in any way.

The routing service options display screen 402 also can include a state field 408. The state field 408 can be used to specify a device state associated with a particular routing scenario 116. As explained herein, the device state specified in the state field 408 and/or otherwise specified for a particular routing scenario 116 can be part of the routing scenario 116 and therefore may be used to determine if a particular routing scenario 116 applies or does not apply at a particular time. In particular, a device state (also referred to herein as a "state") associated with a particular routing scenario 116 can specify one or more operating states for which the routing scenario 116 applies. The operating states can include, but are not limited to "on-not in use," "on-active data session," "on-active voice session," "on-active appli- cation," "on-not in use and silent mode," "on-not in use and do not disturb mode," "on-in use and silent mode," "on-in use and do not disturb mode," "off," other states, combinations thereof, or the like. Thus, the state field 408 can be used to specify a combination of one or more device state for which a routing scenario 116 will apply. Because device states can be defined in various ways, it should be understood that the above examples are illustrative and therefore should not be construed as being limiting in any way.

The routing service options display screen 402 also can include one or more routing service setting controls 410A-H (hereinafter collectively and/or generically referred to as "routing service setting controls 410"). Each of the routing service setting controls 410 can have a corresponding routing service setting description 412A-H (hereinafter collectively and/or generically referred to as "routing service setting descriptions 412").

A user or other entity can interact with the routing service setting controls 410 to specify one or more options or settings associated with a routing scenario 116 being created or modified using the routing service 110 and/or the routing management application 108. According to various embodiments, the routing service setting controls 410 can be replaced with fields, check boxes, dropdown boxes, and/or other controls for setting or controlling routing service settings. As such, it should be understood that various relative and/or absolute schemes or systems can be used to specify grades, weights, values, combinations thereof, or the like. Because various absolute and/or relative value schemes are possible and are contemplated, it should be understood that the above-mentioned ranking values and scales are illustrative and therefore should not be construed as being limiting in any way.

In the illustrated embodiment, the routing service setting control 410A can be used to enable or disable an option to provide emergency treatment of all calls when the routing scenario 116 being created via the routing service options display screen 402 applies to a call. According to some embodiments, "emergency treatment" can refer to interrupting all communications or activities at the called party device 120 when a call is received, ringing or alerting even in silent or "do not disturb" mode when a call is received, or the like. Thus, for example, a user may specify, via the routing scenario 116, that at a particular geographic location, all calls should be provided with emergency treatment and therefore should interrupt calls, ring or alert, or the like. It should be understood that this example is illustrative and therefore should not be construed as being limiting in any way.

The routing service setting control 410B can be used to enable or disable an option to force ring on silent for a particular geographic location and/or when a particular routing scenario 116 applies. It can be appreciated that the difference between the routing service setting control 410A and the routing service setting control 410B can include not ringing or alerting in silent mode for the routing service setting control 410B, not interrupting other calls or activities for the routing service setting control 410B, combinations thereof, or the like. The routing service setting control 410C can be used to enable or disable an option to force ring on do not disturb mode for a particular geographic location and/or when a particular routing scenario 116 applies. It can be appreciated that the difference between the routing service setting control 410A and the routing service setting control 410C can include not ringing or alerting in do not disturb mode for the routing service setting control 410C, not interrupting other calls or activities for the routing service setting control 410C, combinations thereof, or the like. It also can be appreciated that the routing service setting control 410A can provide functionality that can include (but is not limited to) a combination of the routing service setting controls 410B-C. It should be understood that this example is illustrative and therefore should not be construed as being limiting in any way.

The routing service setting control 410D can be used to enable or disable an option to send an email to a user, administrator, secretary, or other party when a call or other communication is received and when a particular routing scenario 116 applies. The routing service setting control 410E can be used to enable or disable an option to send a text message (or multimedia service message) to a user, administrator, secretary, or other party when a call or other communication is received and when a particular routing scenario 116 applies. The routing service setting control 410F can be used to enable or disable an option to route calls or communications to an assistant (or other number, location, or recipient) when a call or other communication is received and when a particular routing scenario 116 applies.

The routing service setting control 410G can be used to enable or disable an option to ignore all communications (or type of communications such as calls, emails, text messages, or the like) when a call or other communication is received and when a particular routing scenario 116 applies. The routing service setting control 410H can be used to enable or disable an option to log all communications and to generate reminders (e.g., a reminder to return the call or other communication) when a call or other communication is received and when a particular routing scenario 116 applies. Because additional and/or alternative routing service setting controls 410 can be included in the routing service options display screen 402, it should be understood that these examples are illustrative and therefore should not be construed as being limiting in any way.

The routing service options display screen 402 also can include a UI control 414 that, when selected, creates a routing scenario 116 with the title, geographic location indication, state indication, and/or options specified in routing service options display screen 402. It should be understood that the routing service options display screen 402 can be displayed at various times other than during creation of a routing scenario 116. For example, the routing service options display screen 402 can be presented in response to selection of an "options" control (not shown), or the like. It should be understood that this example is illustrative and therefore should not be construed as being limiting in any way. The routing service options display screen 402 also can include a UI control 416 to cancel creation of a routing scenario 116 and/or to exit the routing service options display screen 402. Because additional or alternative controls can be included in the routing service options display screen 402, it should be understood that the example embodiment shown in FIG. 4A is illustrative and therefore should not be construed as being limiting in any way.

Referring now to FIG. 4B, a UI diagram showing additional aspects of the concepts and technologies disclosed herein for providing and/or using a routing service 110 is described in detail. In particular, FIG. 4B shows an illustrative screen display 400B, which can be generated by a device such as the user device 102 via interactions with the routing service 110. According to various embodiments, the user device 102 can generate the screen display 400B and/or other screen displays in conjunction with and/or based upon interactions with the routing service 110 described herein (e.g., via rendering web data provided by a web portal exposed by the routing service 110, or the like). It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include a routing scenario group display 420. It should be understood that the routing scenario group display 420 shown in FIG. 4B is one contemplated embodiment of a display that can be interacted with by an administrator, customer, user, or other entity to create one or more routing scenario groups or sets (herein referred to as "groups"). As such, the illustrated embodiment should not be construed as being limiting in any way. As shown in FIG. 4B, the routing scenario group display 420 can provide information relating to one or more groups of routing scenarios 116. In the illustrated embodiment, information associated with two six groups of routing scenarios 116 is illustrated. Because any number of groups of routing scenarios 116 (or no groups) can be represented by information included in the routing scenario group display 420, it should be understood that this example is illustrative and therefore should not be construed as being limiting in any way.

As shown in FIG. 4B, the routing scenario group display 420 can show, for each group of routing scenario 116 represented in the routing scenario group display 420, various types of information and/or can provide the ability to modify the information for each group of routing scenarios 116. In the embodiment illustrated in FIG. 4B, a routing scenario group icon 422 is shown for each group of routing scenarios 116. It should be understood that this example is illustrative and therefore should not be construed as being limiting in any way.

In some embodiments, one or more (or each) of the routing scenario group icons 422 can provide information relating to a corresponding group of routing scenarios 116. In the illustrated embodiment, each of the routing scenario group icons 422 includes a title indication 424, a listing 426 of routing scenarios 116 included in the group of routing scenarios 116, an option 428 to add a routing scenario 116 to the group of routing scenarios 116, and an option 430 to edit the group of routing scenarios 116. It can be appreciated that selection of the option 430 can allow editing of the name, title, and/or other details of the group of routing scenarios 116 as well as, or instead of, allowing adding or removing of one or more routing scenarios 116 from the group of routing scenarios 116. It should be understood that this example is illustrative and therefore should not be construed as being limiting in any way.

It can be appreciated that with reference to the screen display 400B, an administrator (or other entity) can view one or more groups of routing scenarios 116 and/or edit or modify one or more of the groups of routing scenarios 116. An example of a group modification screen 440 for editing a group of routing scenarios 116 is illustrated and described in FIG. 4C. It should be understood that this example is illustrative and therefore should not be construed as being limiting in any way.

The screen display 400B also is illustrated as including a UI control 432 that, when selected, creates a new group of routing scenarios 116 and/or guides a user or other entity through a process to create the new group of routing scenarios 116 (e.g., to create a title, add routing scenarios 116 to the group, or the like). The screen display 400B also includes a UI control 434 to complete viewing of, modification of, and/or creation of groups of routing scenarios 116.

Because additional or alternative controls can be included in the screen display 400B, it should be understood that the example embodiment shown in FIG. 4B is illustrative and therefore should not be construed as being limiting in any way.

Figure 5:
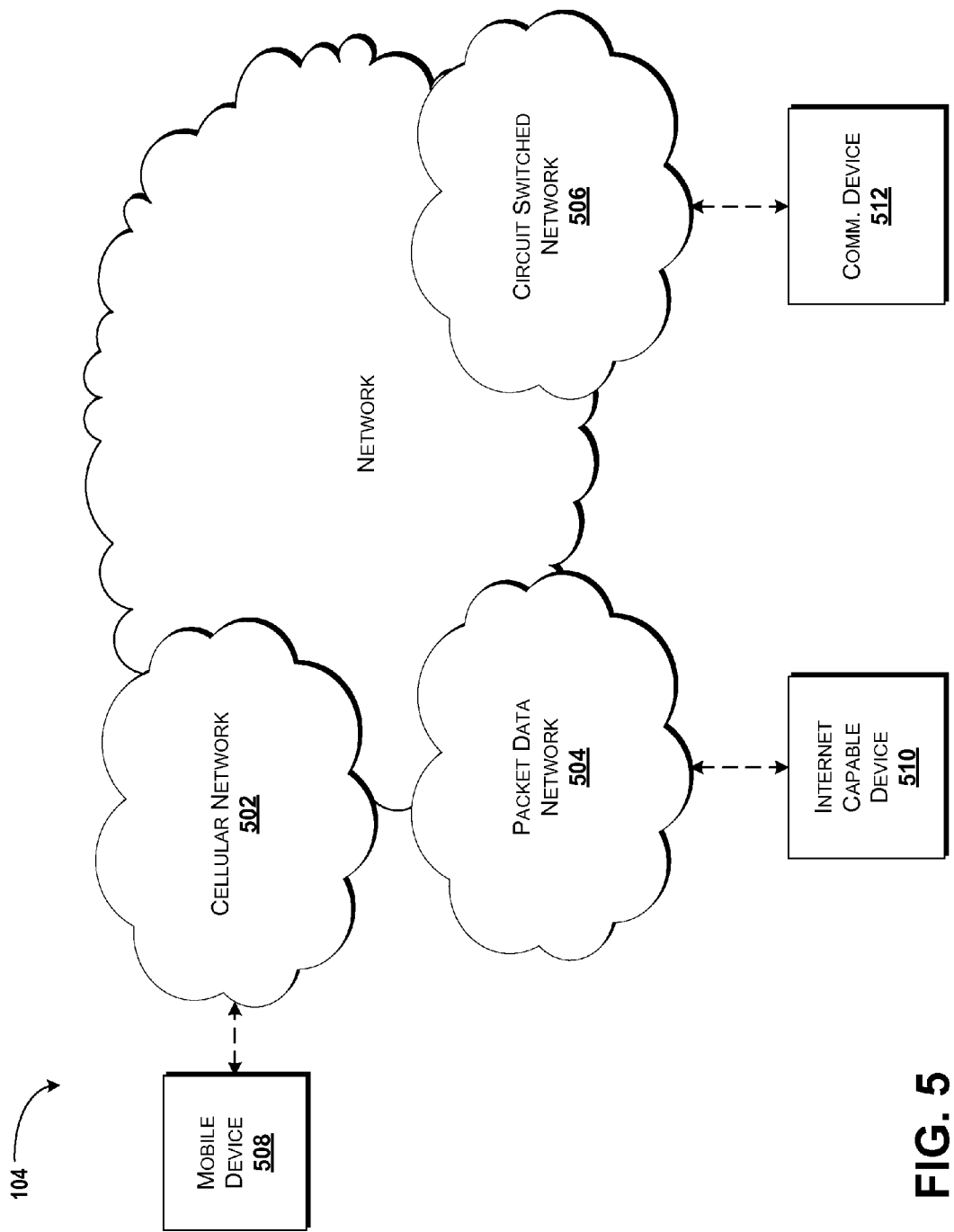
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with one another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like. Although not illustrated separately in FIG. 5, it should be understood that the IMS 130 can be a part of the cellular network 502, though this is not necessarily the case.

Figure 6:
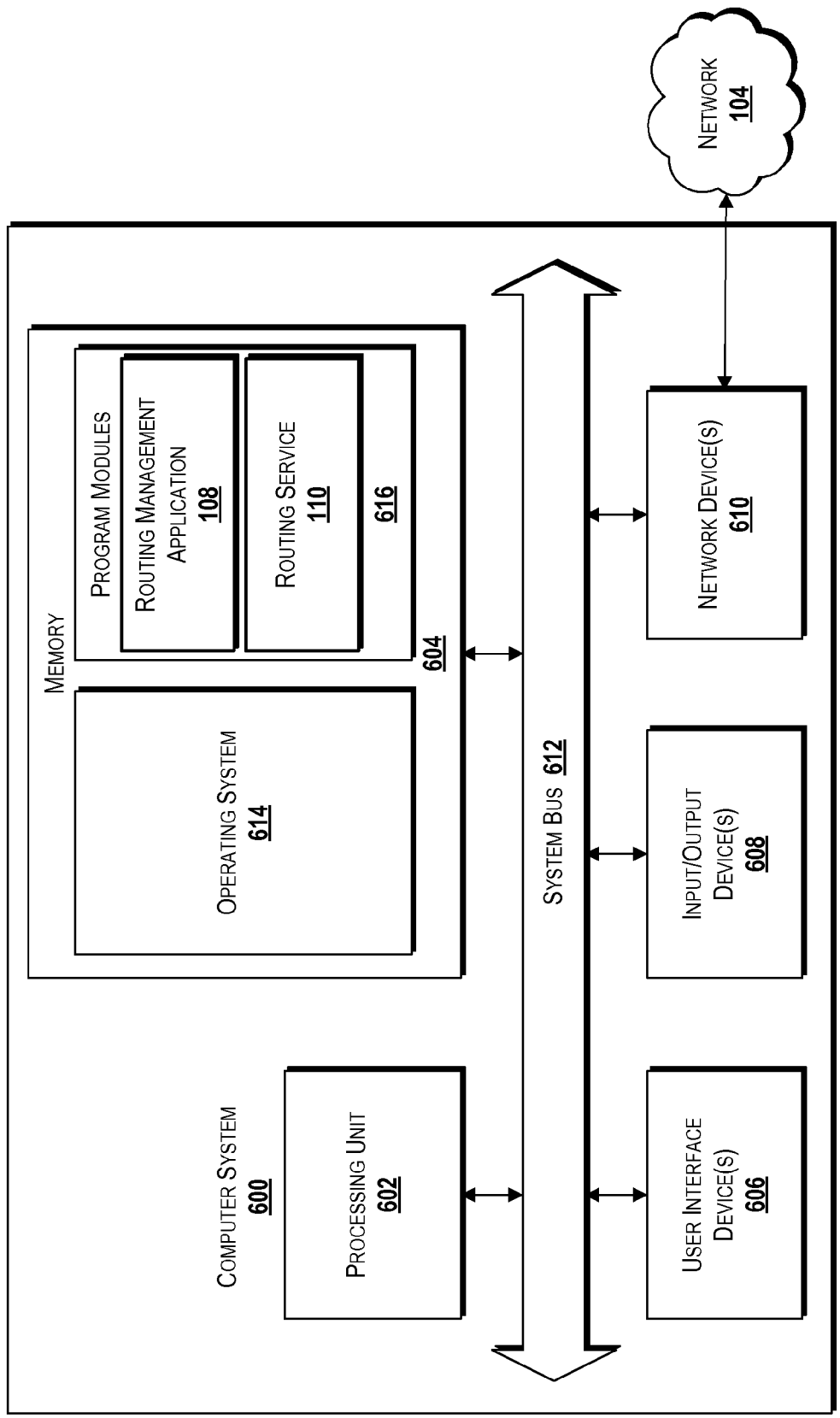
FIG. 6 is a block diagram illustrating an example computer system configured to providing and using a routing service, according to some illustrative embodiments of the concepts and technologies described herein.

FIG. 6 is a block diagram illustrating a computer system 600 configured to provide the functionality described herein for providing and using a routing service, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 include the routing management application 108, the routing service 110, and/or other program modules. These and/or other programs can be embodied in computer-readable media containing instructions that, when executed by the processing unit 602, perform one or more of the methods 200, 300 described in detail above with respect to FIGS. 2-3. According to some embodiments, the program modules 616 may be embodied in hardware, software, firmware, or any combination thereof. Although not shown in FIG. 6, it should be understood that the memory 604 also can be configured to store the routing management data 114, the routing scenarios 116, the location information 122, the query 134, the customer data 136, the state information 138, the call handling decision 140, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
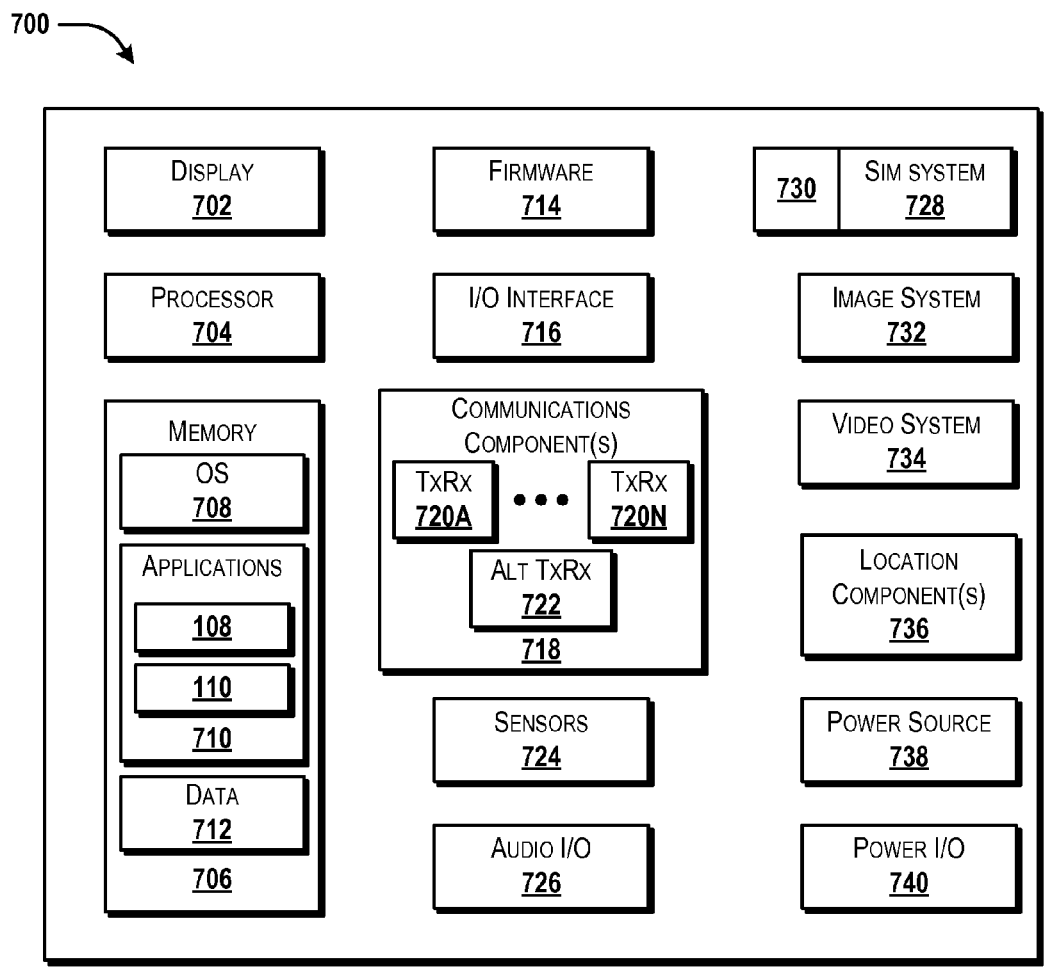
FIG. 7 is a block diagram illustrating an example mobile device configured to interact with a routing service, according to some illustrative embodiments of the concepts and technologies described herein.

Turning now to FIG. 7, an illustrative mobile device 700 and components thereof will be described. In some embodiments, the user device 102, the called party device 120, the calling party device 126, and/or other devices illustrated and described herein can be configured as and/or can have an architecture similar or identical to the mobile device 700 described herein in FIG. 7. It should be understood, however, that the various devices illustrated and described herein may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for obtaining and/or modifying routing scenarios 116, creating or managing groups of routing scenarios 116, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the routing management application 108, the routing service 110, and/or other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, creating routing scenarios 116, creating or modifying groups of routing scenarios 116, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interfac 716 can be configured to support the input/output of data such as routing management data 114, location information 122, state information 138, a query 134, a call handling decision 140, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and using a routing service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
obtaining, by a processor that executes a routing service, a routing scenario associated with a customer of the routing service, wherein the routing scenario specifies customer data that is to be accessed to determine a call handling decision when a call is received from a calling party, wherein the customer data comprises information that is associated with the customer and the calling party, and wherein the customer data is stored by a customer data source that is remote from the routing service;
obtaining, by the processor, a request to route the call, wherein the call is intended for a called party device associated with the customer, and wherein the call is received from the calling party;
obtaining, by the processor and from the customer data source, the customer data;
identifying, by the processor, a state of the called party device and a location of the called party device;
determining, by the processor, the call handling decision based upon the customer data, the state, the location, and the routing scenario; and
providing, by the processor, the call handling decision to a network to route the call.

2. The method of claim 1, wherein the network comprises an internet protocol multimedia subsystem comprising a proxy call session control function, and wherein the proxy call session control function performs an action in response to receiving the call handling decision.

3. The method of claim 2, wherein the customer data comprises an order history associated with the calling party, and wherein the customer data is obtained using a representational state transfer request.

4. The method of claim 1, further comprising:
generating the routing scenario; and
storing the routing scenario with data that identifies a called party associated with the call, wherein the routing scenario specifies an action to be performed when the call is received, wherein the action comprises one action selected from a group of actions comprising sending a message and prompting an action by an entity.

5. The method of claim 1, wherein generating the routing scenario comprises receiving, from a user device, routing management data, the routing management data comprising:
a data source identifier that identifies a customer data source that comprises a storage location;
a call handling rule;
a state identifier that identifies an operating state during which the call handling rule applies; and
geographic location data that identifies a location associated with the routing scenario and defines a location at which the routing scenario applies.

6. The method of claim 1, wherein obtaining the routing scenario comprises obtaining a plurality of routing scenarios in response to determining that a group of routing scenarios has been activated.

7. The method of claim 1, wherein the request is received from a device operating on the network.

8. The method of claim 1, wherein the request is received from a calling party device.

9. A system comprising:
a processor; and
a memory that stores computer-executable instructions that, when executed by the processor, cause the processor to perform operations comprising
obtaining a routing scenario associated with a customer of a routing service, wherein the routing scenario specifies customer data that is to be accessed to determine a call handling decision when a call is received from a calling party, wherein the customer data comprises information that is associated with the customer and the calling party, and wherein the customer data is stored by a customer data source that is remote from the routing service,
obtaining a request to route the call, wherein the call is intended for a called party device associated with the customer, and wherein the call is received from the calling party,
obtaining, from the customer data source, the customer data,
identifying a state of the called party device and a location of the called party device,
determining the call handling decision based upon the customer data, the state, the location, and the routing scenario, and
providing the call handling decision to a network to route the call.

10. The system of claim 9, wherein the network comprises an internet protocol multimedia subsystem comprising a proxy call session control function, and wherein the proxy call session control function performs an action in response to receiving the call handling decision.

11. The system of claim 10, wherein the customer data comprises an order history associated with the calling party, and wherein the customer data is obtained using a representational state transfer request.

12. The system of claim 9, wherein the computer-executable instructions, when executed by the processor, cause the processor to perform operations further comprising:
generating the routing scenario; and
storing the routing scenario with data that identifies a called party associated with the call.

13. The system of claim 9, wherein generating the routing scenario comprises receiving, from a user device, routing management data, the routing management data comprising:
a data source identifier that identifies a customer data source that comprises a storage location;
a call handling rule;
a state identifier that identifies an operating state during which the call handling rule applies; and
geographic location data that identifies a location associated with the routing scenario and defines a location at which the routing scenario applies.

14. A computer storage medium having computer-executable instructions stored thereon that, when executed by a processor, cause the processor to perform operations comprising:
obtaining a routing scenario associated with a customer of a routing service, wherein the routing scenario specifies customer data that is to be accessed to determine a call handling decision when a call is received from a calling party, wherein the customer data comprises information that is associated with the customer and the calling party, and wherein the customer data is stored by a customer data source that is remote from the routing service;
obtaining a request to route the call, wherein the call is intended for a called party device associated with the customer, and wherein the call is received from the calling party;
obtaining, from the customer data source, the customer data;
identifying a state of the called party device and a location of the called party device;
determining the call handling decision based upon the customer data, the state, the location, and the routing scenario; and
providing the call handling decision to a network to route the call.

15. The computer storage medium of claim 14, wherein the network comprises an internet protocol multimedia subsystem comprising a proxy call session control function, and wherein the proxy call session control function performs an action in response to receiving the call handling decision.

16. The computer storage medium of claim 15, wherein the customer data comprises an order history associated with the calling party.

17. The computer storage medium of claim 14, wherein the computer-executable instructions, when executed by the processor, cause the processor to perform operations further comprising:
generating the routing scenario; and
storing the routing scenario with data that identifies a called party associated with the call.

18. The computer storage medium of claim 14, wherein generating the routing scenario comprises receiving, from a user device, routing management data, the routing management data comprising:
a data source identifier that identifies a customer data source that comprises a storage location;
a call handling rule;
a state identifier that identifies an operating state during which the call handling rule applies; and geographic location data that identifies a location associated with the routing scenario and defines a location at which the routing scenario applies.

19. The method of claim 1, wherein the location of the called party device comprises a geographic location of the called party device that is obtained from the called party device.

20. The method of claim 1, wherein the state identifies an operating state of the called party device.

* * * * *